US 8,060,699 B2

(12) United States Patent
Strumpen et al.

(10) Patent No.: US 8,060,699 B2
(45) Date of Patent: Nov. 15, 2011

(54) SPIRAL CACHE MEMORY AND METHOD OF OPERATING A SPIRAL CACHE

(75) Inventors: Volker Strumpen, Austin, TX (US); Matteo Frigo, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 12/270,095

(22) Filed: Nov. 13, 2008

(65) Prior Publication Data

US 2010/0122035 A1 May 13, 2010

(51) Int. Cl.
*G06F 12/00* (2006.01)
*G06F 13/00* (2006.01)
*G06F 13/28* (2006.01)

(52) U.S. Cl. .................................. 711/133; 711/118
(58) Field of Classification Search .......... 711/118–119, 711/133–136
See application file for complete search history.

(56) References Cited

U.S. PATENT DOCUMENTS

| 5,355,345 | A | 10/1994 | Dickinson et al. |
| 7,107,399 | B2 | 9/2006 | Bilardi et al. |
| 2002/0116579 | A1* | 8/2002 | Goodhue et al. ............. 711/120 |
| 2005/0114618 | A1 | 5/2005 | Lu et al. |
| 2005/0132140 | A1 | 6/2005 | Burger et al. |
| 2006/0212654 | A1* | 9/2006 | Balakrishnan ............... 711/125 |

OTHER PUBLICATIONS

Akioka, et al., "Ring data location prediction scheme for Non-Uniform Cache Architectures," International Conference on Computer Design, Piscataway 2008.

Jin, et al., "A Domain-Specific On-Chip Network Design for Large Scale Cache Systems," 13th *International Symposium on High-Performance Computer Architecture (HPCA-13)*. Phoenix, 2007.
Bilardi et al., "Optimal Organizations for Pipelined Hierarchical Memories", SPAA '02, Aug. 2002, p. 109-116, Winnipeg, Manitoba, Canada.
Kwon et al., "A Scalable Memory System Design", 10$^{th}$ International Conference on VLSI Design, Jan. 1997, p. 257-260.
Kim et al., "An Adaptive, Non-Uniform Cache Structure for Wire-Delay Dominated On-Chip Caches", ASPLOS X, Oct. 2002, p. 211-222, San Jose, CA.
Baer et al., "On the Inclusion Properties for Multi-Level Cache Hierarchies", IEEE, Feb. 1988, p. 73-80.

(Continued)

*Primary Examiner* — Jared Rutz
*Assistant Examiner* — Ryan Bertram
(74) *Attorney, Agent, or Firm* — Mitch Harris, Atty at Law, LLC; Andrew M. Harris; Libby Z. Toub

(57) ABSTRACT

A memory provides reduction in access latency for frequently-accessed values by self-organizing to always move a requested value to a front-most central storage element of a spiral. The occupant of the central location is swapped backward, which continues backward through the spiral until an empty location is swapped-to, or the last displaced value is cast out of the last location in the spiral. The elements in the spiral may be cache memories or single elements. The resulting cache memory is self-organizing and for the one-dimensional implementation has a worst-case access time proportional to N, where N is the number of tiles in the spiral. A k-dimensional spiral cache has a worst-case access time proportional to $N^{1/k}$. Further, a spiral cache system provides a basis for a non-inclusive system of cache memory, which reduces the amount of space and power consumed by a cache memory of a given size.

24 Claims, 16 Drawing Sheets

OTHER PUBLICATIONS

Dickinson et al., "A Systolic Architecture for High Speed Pipelined Memories", IEEE, 1993, p. 406-409.

Beckmann et al., "Managing Wire Delay in Large Chip-Multiprocessor Caches", 37th Annual IEEE/ACM International Symposium on Microarchitecture, Dec. 2004, p. 319-330, Portland, OR.

Chishti et al., "Distance Associativity for High-Performance Energy-Efficient Non-Uniform Cache Architectures", 36th Annual IEEE/ACCM International Symposium on Microarchitecture, Dec. 2003, 55-66, San Diego, CA.

Dybdahl et al., "An Adaptive Shared/Private NUCA Cache Partitioning Scheme for Chip Multiprocessors", 13th International Symposium on High Performance Computer Architecture, Feb. 2007, p. 2-12, Phoenix, AZ.

Foglia et al, "A NUCA Model for Embedded Systems Cache Design", 3rd IEEE Workshop on Embedded Systems for Real-Time Multimedia, Sep. 2005, p. 41-46, New York, NY.

Huh et al., "A NUCA Substrate for Flexible CMP Cache Sharing", International Conference on Supercomputing, Jun. 2005, p. 31-40, Boston, MA.

Muralimanohar et al., "Optimizing NUCA Organizations and Wiring Alternatives for Large Caches With CACTI 6.0", 40th Annual IEEE/ACM International Symposium on Microarchitecture, Dec. 2007, p. 3-14, Chicago, IL.

Abella et al., "Power Efficient Data Cache Designs", IEEE Computer Society, Oct. 2003, p. 3-8, San Jose, CA.

Gilbert et al., "Variable-Based Multi-Modual Data Caches for Clustered VLIW Processors", IEEE Computer Society, Sep. 2005, p. 3-13, St. Louis, MO.

Gonzales et al., "A Data Cache with Multiple Caching Strategies Tuned to Different Types of Locality", ACM, 1995, p. 338-347.

Lee et al., "Region-Based Caching: An Energy Delay Efficient Memory Architecture for Embedded Processors", CASES, 2000, p. 120-127.

U.S. Appl. No. 12/264,682, filed Nov. 4, 2008, Li et al.

* cited by examiner

| 30 | 26 | 22 | 18 | 15 | 13 | 12 | 14 |
|----|----|----|----|----|----|----|----|
| 28 | 24 | 20 | 16 | 11 | 9  | 8  | 10 |
| 29 | 25 | 21 | 17 | 1  | 0  | 5  | 7  |
| 31 | 27 | 23 | 19 | 2  | 3  | 4  | 6  |
| 39 | 37 | 35 | 33 | 32 | 34 | 36 | 38 |
| 47 | 45 | 43 | 41 | 40 | 42 | 44 | 46 |
| 55 | 53 | 51 | 49 | 48 | 50 | 52 | 54 |
| 63 | 61 | 59 | 57 | 56 | 58 | 60 | 62 |

SPIRAL CACHE MEMORY AND METHOD OF OPERATING A SPIRAL CACHE

CROSS-REFERENCE TO RELATED APPLICATIONS

The present Application is related to U.S. patent application Ser. No. 12/270,132, entitled "TILED STORAGE ARRAY WITH SYSTOLIC MOVE-TO-FRONT REORGANIZATION" and filed contemporaneously herewith, and U.S. patent application Ser. No. 12/270,186, entitled "STORAGE ARRAY TILE SUPPORTING SYSTOLIC MOVEMENT OPERATIONS" and filed contemporaneously herewith, and U.S. patent application Ser. No. 12/270,249, entitled "SPIRAL CACHE POWER MANAGEMENT, ADAPTIVE SIZING AND INTERFACE OPERATIONS" and filed contemporaneously herewith. Each of the above-listed U.S. Patent Applications has at least one common inventor with the present application and is assigned to the same Assignee. The disclosures of all of the above-referenced U.S. Patent Applications are incorporated herein by reference.

BACKGROUND OF THE INVENTION

1. Field of the Invention

The present invention is related to cache memories, and more particularly to a cache memory having a spiral organization in which non-uniform access times are exploited so that most-frequently accessed values have the shortest access times.

2. Description of Related Art

In present-day cache memory systems, there is a trade-off between the time required to access most-frequently-accessed values, and the number of such values available at the shortest access times. For example, in a traditional multi-level cache hierarchy, the level-one (L1) cache provides a uniform access time for a particular number of values, and control circuits and other algorithmic features of some systems operate to maintain the most-frequently-accessed values within the L1 cache. However, due to physical wiring constraints and the fact that electronic systems are limited by the propagation speed of electronic signals, the larger the L1 cache, the longer the (fixed) access time for the typical L1 cache. Similarly, as the size of the L1 cache is reduced in order to reduce the access time, the number of frequently-accessed values that are not stored in the L1 cache increases. The values not stored in the L1 cache are therefore stored in higher-order levels of the memory hierarchy (e.g., the L2 cache), which provides a much greater penalty in access time than that provided by the L1 cache, as the typical cache memory system is inclusive, that is, higher-order levels of the memory hierarchy contain all values stored in the next lower-order level. For practical purposes, a given higher-order cache memory is generally much larger than the cache memory of the next lower order, and given the propagation speed constraints mentioned above, e.g., RC wire delay and the eventual limitation of the inherent speed of electric field propagation in die interconnects, the higher-order cache is much slower, typically on the order of 10-100 times slower than the next lower-order cache memory.

Further, the typical cache control algorithm employed in such cache memory systems typically handles one outstanding request to a cache level at a time. If an access request "misses" a cache, the access is either stalled or fails and must therefore be retried by the source of the request (e.g., a next lower-order numbered cache level or a processor memory access logic in the case of an L1 cache miss). The request is propagated away from the processor toward a higher-order level of cache memory, but retrying requests later at the L1 level ensures that access to the cache is still provided for other instructions that can execute while a hardware thread dependent on the requested value is waiting for the request to succeed. The alternative of stalling the entire processor pipeline is available, but provides an even more severe performance penalty.

Finally, the organization of values in a cache memory hierarchy is typically imposed by control structures within the cache memory hierarchy, e.g., cache controllers, that measure access frequencies according to schemes such as least-recently-used (LRU) and organize the levels of cache to maintain the most-frequently accessed values in the lower-order caches using cast-out logic.

Solutions other than the traditional cache memories and hierarchy described above have been proposed that permit multiple requests to be pipelined, but require the imposition of fixed worst-case access latencies and buffering to control the flow of the pipelined information. Further, non-traditional cache memories have been proposed that have a non-uniform access latency and that are organized without using additional access measurement and cast-out logic, but generally only offer a small potential improvement over the operation of present cache memories by swapping cache entries to slowly migrate frequently accessed values to "closer" locations, while migrating less frequently used values to "farther" locations. Such non-uniform cache memories also require additional pathways to perform the swapping and are typically routed systems, in which switching circuits are used to perform selection of a particular cache bank.

Therefore, it would be desirable to provide a cache memory and method of cache operation that can support multiple outstanding requests, provide very low latency of access for frequently accessed values and that can provide such operation without complicated and area-intensive routing circuits, as well as LRU and cast-out logic.

BRIEF SUMMARY OF THE INVENTION

The invention is embodied in a spiral cache memory and method of operation. The spiral cache memory has multiple storage locations for storing values, each of which may be a smaller cache memory such as a direct-mapped cache or an associative cache. The multiple storage locations are coupled to access circuitry forming at least one information pathway along which requested values are moved to a (central) front-most storage location in order to satisfy the requests. The previous value from the front-most location is swapped backward to the next farther location, whose contents are again swapped backward until either an empty location is reached, or a value is "cast out" of the last (back-most) location. The information pathways may be multiple information pathways, in particular a first set of inter-neighbor connections may be used for the move-to-front operation while a second set of inter-neighbor connections provides the backward swap pathway, but a single pathway may alternatively be multiplexed to provide both the move-to-front and the backward swap operations.

The above-described spiral cache can be implemented in a tiled memory formed by replicated tiles of a single design. The spiral cache exploits the dimensionality of Euclidean space such that a one-dimensional spiral cache has a worst-case access time proportional to N, where N is the number of tiles and a k-dimensional spiral cache has a worst-case access time proportional to $N^{1/k}$. Requests are propagated to the outside of the spiral, but rather than being propagated past every storage location, since the storage locations are organized as a spiral, the requests need only propagate across the number of "turns" in the spiral in order to reach the farthest elements. Requests are issued with a bit indicating that the request is unfulfilled and a requested address. When a requested address is found at one of the storage elements, the bit is set to indicate that the request has been fulfilled and the requested value is appended to or used to populate an existing field in the request. Requests are forwarded, and returned from the outer turn of the spiral, in a pattern that guarantees that if two requests arrive at the same tile at the same time, they are copies of the same request, and at most, only one of the requests can be fulfilled.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

FIGS. 11A-11B are block diagrams illustrating spiral cache design having non-uniform tile sizes in accordance with another embodiment of the present invention.

DETAILED DESCRIPTION OF THE INVENTION

Figure 1A:
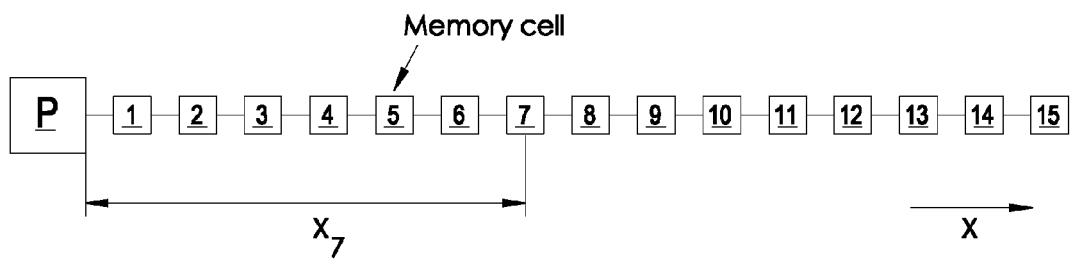
FIGS. 1A-1C are pictorial diagrams illustrating advantages of a placement technique within a spiral cache according to an embodiment of the present invention.

Introduction The present invention encompasses a novel cache memory structure that is structurally organized as a spiral and self-organizes its contents to place the most-recently accessed value at the front-most central storage location, while moving other values backwards at each access to a location other than the front-most central storage location.

The fundamental principle underlying the spiral cache is that the traditional uniform-access-latency random access memory (RAM) model is no longer valid for single-chip architectures. Today's signal propagation delays across present-day large dies at high clock frequencies are on the order of tens of clock cycles at a minimum. At the same time, the advantages of single-chip integration necessitate for large on-chip cache memories. Large and fast cache memories have long been viewed as a conundrum, because large memories require large spatial extent, but fast memories require small spatial extent, in order to minimize the propagation delays. The present invention provides large and fast caches by dynamically moving cache lines on a substantially continuous basis. The key characteristics of a spiral cache according to the present invention are:

1. A tiled architecture of small and fast (e.g. direct-mapped) caches balance wire delay and cache access time at the technological and physical limits;
2. The move-to-front heuristic is used to place and replace cache lines dynamically with theoretical guarantees on the maximum access time;
3. N tiles of the spiral cache behave like an N-way associative cache without the cost of traditional bookkeeping such as least-recently-used (LRU) counters; and
4. The spiral cache architecture provides a conflict-free systolic pipeline capable of keeping multiple memory accesses in flight, without routing or switching delays and without requiring data buffering to effect flow control.

While, as mentioned above, systolic architectures for cache memories have been proposed, in those designs, a worst-case access latency is imposed for each value requested, no matter the location in the cache memory. In such designs, requests must travel to the far end of the cache memory, and then traverse each block (or "tile" in the terminology used in the present application) on the way back to the processor or other requestor. The spiral cache memory does not suffer the worst-case latency at each access. Instead, the majority of accesses incur the best-case latency of accessing the front-most tile only, and therefore the spiral cache provides improved performance. Other pipelined memory architectures require internal buffers for controlling the flow of data through a one-dimensional hierarchy of memory tiles. The storage array of the present invention does not require internal flow control buffers, and is not limited to one-dimensional designs. In fact, the storage array of the present invention as embodied in the spiral cache described in the examples below exploits the dimensionality of Euclidean space to reduce the worst-case access latency. The spiral cache of the present invention may be viewed as a so-called non-uniform cache architecture (NUCA).

Dynamic Cache Placement In order to reduce the access time for frequently-accessed values, and as mentioned above, the exemplary storage array disclosed herein dynamically self-organizes during accesses to place more frequently-accessed values toward the front-most location at the center of the spiral, and to place less frequently-accessed values toward the outside of the spiral. Signal propagation delays across wires are a primary design constraint for large and fast VLSI designs, and the following illustration is provided to explain the advantages of the spiral cache memory architecture.

A Spatial Memory Model In order to account for wire delays, a memory model is introduced below, by way of illustration, in which a width can be associated with each cell of a 1-dimensional memory array as illustrated in FIG. 1A. When a processor P issues a load request to storage cell 7, a request signal propagates across storage cells 1 through 6 to storage cell 7, and the data stored in storage cell 7 propagates in the reverse direction back to processor P. In order for a systolic implementation to provide movement between storage cells 1-7, which will be described in further detail as a mechanism for moving values in the spiral cache, signals must travel across one storage cell within one clock cycle. If storage cells 1-7 are implemented as single bit memories, the spatial extent of the illustrated memory array could be tiny and would support a high clock frequency to satisfy the one clock cycle requirement for a systolic design. However, if the storage cell is implemented as a larger memory structure, for example a direct-mapped or associative cache, a clock frequency can be assigned to match the access latency of the memory array. The smaller the memory array, the shorter the propagation delay of a signal traveling across the memory array, and therefore the higher the clock frequency that matches the access latency of the memory array. The access latency of the $i^{th}$ cell is the propagation time of a round-trip from processor P to cell I, which is given by $t_i=2x_i$ or $t_i=2i$ clock cycles under the assumption that a signal traverses the distance of a storage cell within one clock cycle. Therefore, in the illustration, $x_7$, the time required to access storage cell 7 is fourteen clock cycles. In the following description, a spatial-memory model is used to compare placement algorithms for caches.

Placement Algorithms A cache placement algorithm determines the map of program addresses to memory locations, which are generally cache lines. In conventional cache design, a placement algorithm such as least-recently-used (LRU) is used for managing the lines within the same set (also called congruence class) of a set-associative architecture. In the spatial memory model given above, the placement algorithm has a direct impact on the average access latency, even if the entire working set fits into the cache and no evictions occur due to conflict misses. The effect of different placement algorithms on the average access latency can be observed using a sample access trace:

load A, load B, load C, load C, load B, load B.

Figure 1B:
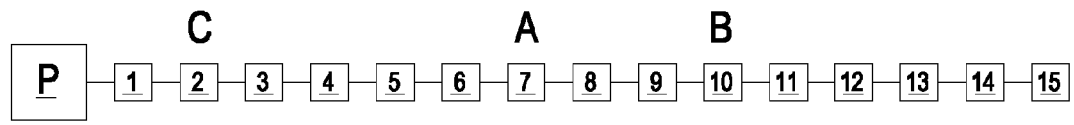

The simplest cache placement algorithm, variations of which are employed in direct-mapped cache design, interprets the least significant bits of a line address as the index of the cache line. Referring now to FIG. 1B, an example is given in which the mapping from addresses to memory cell indices, in which the value for address A is stored in storage cell 7, the value for address B is stored in storage cell 10 and the value for address C is stored in storage cell 2. It is noted that the above mapping precludes any control over the distance of the placement of the values from the processor. The effectiveness of the placement algorithm can be evaluated by computing the average access latency of the sample access trace. Assuming that the cache is initially empty, the first access due to instruction load A requires a backing store access, the loaded value corresponding to address A is stored in storage cell 7, and then incurs $t_7=14$ clock cycles of cache access latency. The next two load instructions load B and load C also require backing store accesses, whereas the remaining three instructions are served directly out of the cache. The access latencies (in cycles) are illustrated below in Table I.

TABLE I

| instruction | load A | load B | load C | load C | load B | load B |
|---|---|---|---|---|---|---|
| access latency | 14 | 20 | 4 | 4 | 20 | 20 |
| backing store access | yes | yes | yes | no | no | no |

The total number of clock cycles consumed by access latency is 82, in addition to the cycles required for three backing store accesses. The average access latency, not counting the backing store accesses, is hence 82/6=13.7 cycles per access.

Figure 1C:
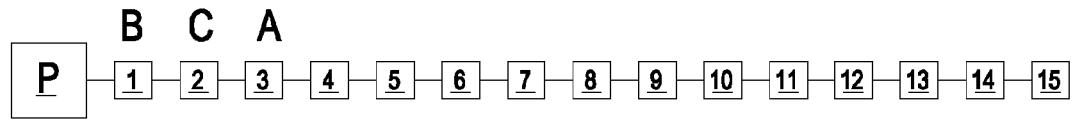

A more effective placement algorithm can be implemented by mapping addresses into storage cells 1-15 according to the frequency of accesses to the values corresponding to the addresses. The most frequently accessed value would be stored closest to processor P to minimize the average access latency. In the sample access trace, the most frequently accessed address is B, which is accessed three times. Hence, the value for address B should be stored in storage cell 1. The second most frequently accessed value is at address C, which should be stored in storage cell 2 and the third most frequently accessed value at address A would then be stored in storage cell 3, as illustrated in FIG. 1C. Analogous to the accounting of access latencies shown in Table I above, Table II below summarizes the access latencies for the cache value placement illustrated in FIG. 1C.

TABLE II

| instruction | load A | load B | load C | load C | load B | load B |
|---|---|---|---|---|---|---|
| access latency | 6 | 2 | 4 | 4 | 2 | 2 |
| backing store access | yes | yes | yes | no | no | no |

The sum of the access latencies in Table II is 20 clock cycles, and the average access latency is 20/6=3.33 clock cycles per access. Thus the average access latency of the direct-mapped placement illustrated in FIG. 1B, at 13.7 cycles per access, is more than four times larger than the placement based on access frequency illustrated in FIG. 1C.

Unfortunately, the access frequency of the trace of a program is generally not known in advance. However, there exists an on-line placement strategy that is provably within a factor of 2 of the best off-line strategy, known as "move-to-front." The move-to-front strategy moves each requested value to the front of the array. To make space for a new value in the front of the array, the value currently stored in the front of the array is pushed back towards the tail of the array. Since the placement of the values (e.g., cache lines) is dynamic, each value must be searched at subsequent accesses.

Figure 2:
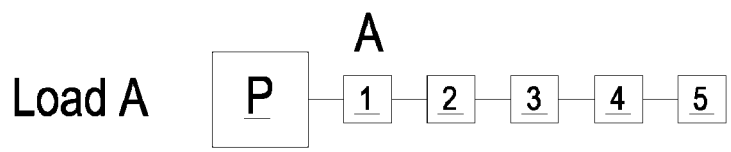
FIG. 2 is a pictorial diagram illustrating dynamic re-arrangement of values within a spiral cache according to an embodiment of the present invention.
Figure 2:
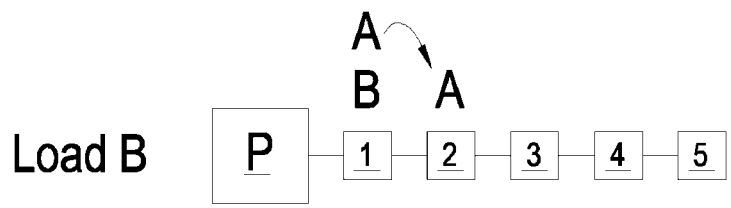
Figure 2:
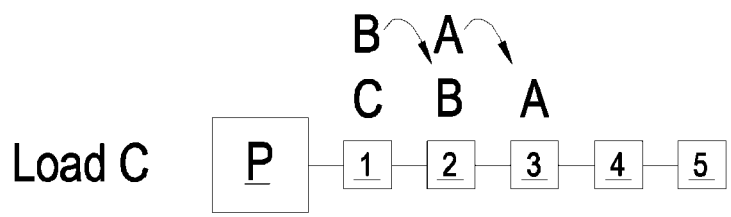
Figure 2:
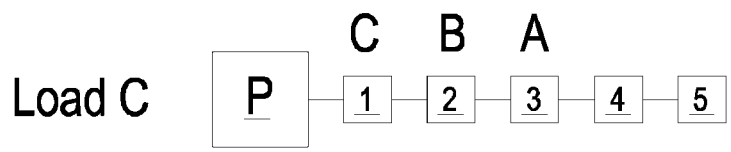
Figure 2:
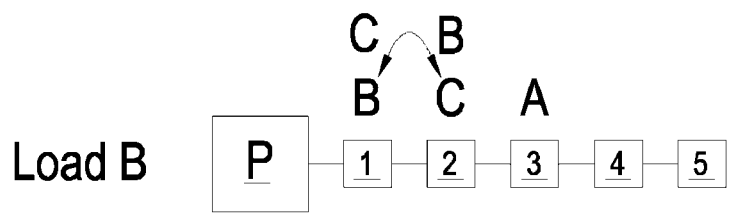
Figure 2:
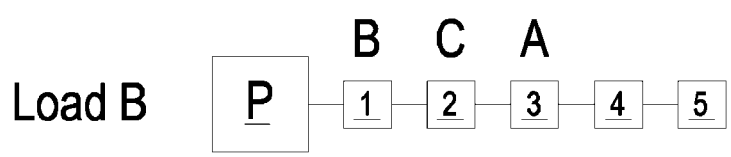

Referring now to FIG. 2, the placement of values according to their addresses by a move-to-front heuristic is shown. Unlike the static placements illustrated in FIG. 1B and FIG. 1C, the dynamic placement of FIG. 2 adapts the mapping to the access pattern of a program's trace during execution. The first three load instructions fetch the values from memory according to addresses A, B and C and move the associated data into front-most storage cell 1 at each access. Then, the second load at address C finds the requested value (i.e., finds an address match to C) in storage cell 1, incurring the minimum access latency of 2 clock cycles. Next, the second access at address B moves the requested value (along with its address) from storage cell 2 into front-most storage cell 1, effectively swapping the contents of front-most storage cell 1 with the contents of storage cell 2. The final access at address B finds the requested value in cell 1, causing the minimal access latency of 2 clock cycles. Table III, below, illustrates the access latency for the placement scheme of FIG. 2.

TABLE III

| instruction | load A | load B | load C | load C | load B | load B |
|---|---|---|---|---|---|---|
| access latency | 2 | 2 | 2 | 2 | 4 | 2 |
| backing store access | yes | yes | yes | no | no | no |

The sum of the access latencies is 14 clock cycles, and the average access latency is 14/6=2.3 clock cycles per access. Ignoring the accesses to main memory, it is noteworthy that the move-to-front heuristic produces an even smaller average access latency than the placement based on access frequency, even though the access-frequency placement is based on the knowledge of the entire trace, whereas the move-to-front placement considers one access at a time only.

The Move-to-Front Heuristic The move-to-front heuristic has been shown to be 2-competitive in the context of maintaining a list, in that, move-to-front is, to within a constant factor, as efficient as any algorithm, including those based on knowing the entire sequence of operations. The move-to-front heuristic enables the spiral cache to be organized, such that the total access latency due to load, store, or eviction operations is no worse than twice the access latency incurred by any algorithm that has complete knowledge about the entire trace. The spiral cache of the present invention implements a placement algorithm based on the move-to-front heuristic. Its 2-competitiveness provides a bound on the access latency of this implementation, and therefore provides a theoretical guaranteed limit on access latency.

Architecture of the Spiral Cache The spiral cache of the present invention exploits the dimensionality of Euclidean space to reduce the worst-case access latency, and offers a systolic data flow capable of pipelining multiple accesses. In the following illustrative embodiment the storage cell associated with a tile of a spiral cache is itself an entire storage array. In general, an efficient tile design balances the size of the tile's array such that the propagation delay of the wires connecting neighboring tiles is equal to the access latency of the tile's array. One embodiment of the spiral cache uses a fast, direct-mapped cache within each tile, and uses a cache line as the unit of data transfer between the tiles. In the present application, the memory within a tile is referred to as the memory array irrespective of the particular cache architecture and physical layout that are employed in the tiles. The tiles further provide the movement functionality in the illustrated embodiment as described below according to a distributed control logic provided by control logic of the individual tiles, although in an alternative embodiment, global control logic may be used to control the information flow.

Figure 3:
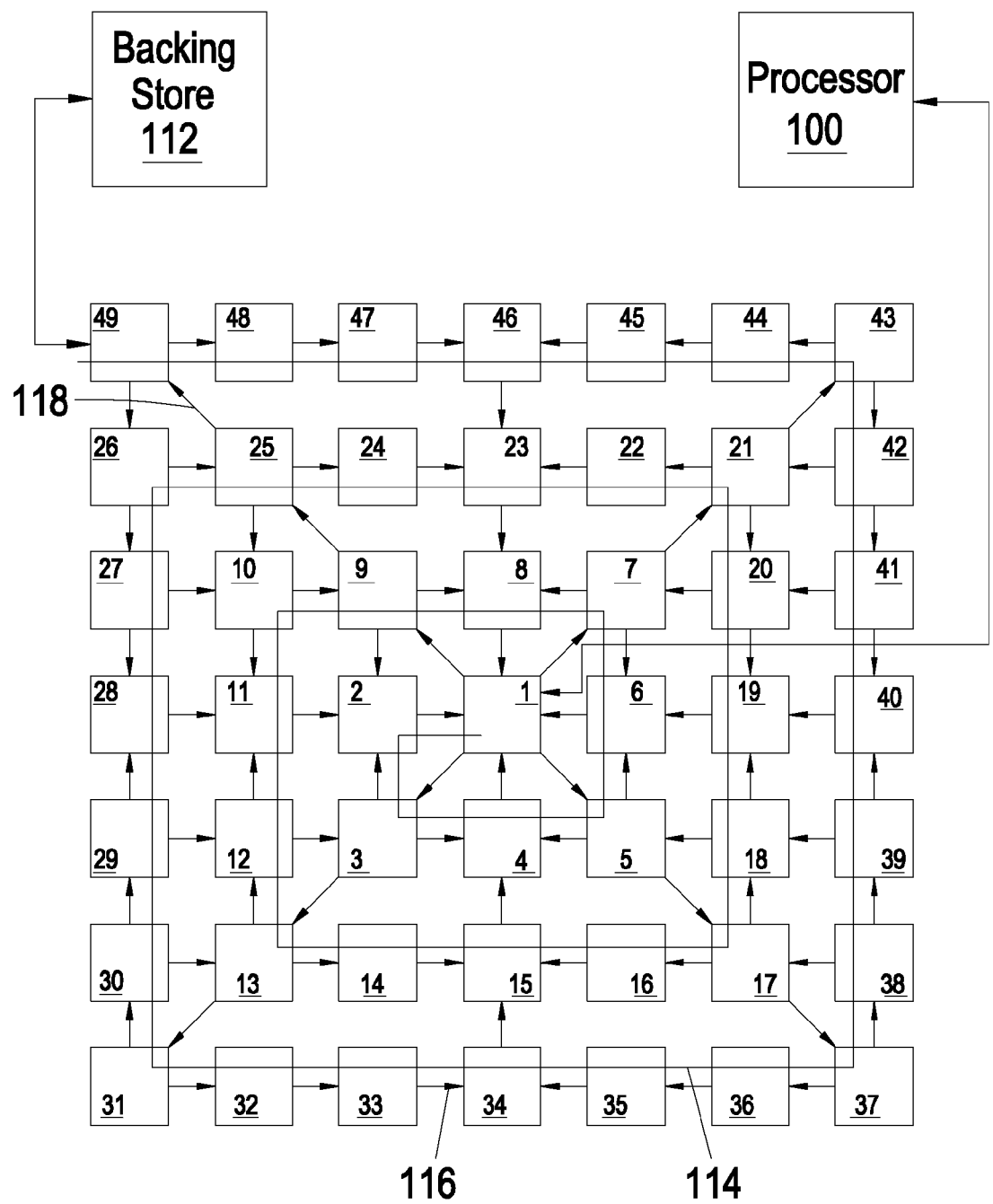
FIG. 3 is a block diagram of a spiral cache according to an embodiment of the present invention.

Basic Spiral Cache Architecture The basic architecture of a 2-dimensional spiral cache in accordance with the present invention is shown in FIG. 3. The spiral nature of the cache can be visualized as a "wrapping" of the linear array of FIG. 1A around tile 1, such that the linear array now forms an Archimedes spiral with a Manhattan layout. A processor 100, lower-order cache, or other data/instruction sink connects to the front end of the spiral at front-most tile 1. The tail end of the spiral, in the examplary 7×7 matrix of tiles, tile 49 connects to a backing store 112, which may be a higher-order cache, system memory, disc storage or other data/instruction storage. Before discussing the interconnect network(s) illustrated in FIG. 3, it is useful to describe in more detail the operation of a simpler linear array. When implementing the move-to-front based placement algorithm on the linear array in FIG. 1A, two functionalities are required: (1) move data to the front; and (2) push data back to make space for an item that is moved to the front. For example, consider the second load instruction for address B in FIG. 2. The address-to-cell mapping prior to executing the second load B instruction is C→1, B→2, A→3. To move the value corresponding to address B to the front, the array must be searched for B by scanning the array from the front. When address B is found in storage cell 2, the associated data are communicated towards the processor, leaving storage cell 2 empty. When the value corresponding to address B arrives at front-most storage cell 1, front-most storage cell 1 is "freed" by swapping the value corresponding to address C with the value corresponding to address B. Then, the value corresponding to address C is communicated towards the tail end of the spiral until an empty cell is encountered. In the example, storage cell 2 is free to accommodate the value corresponding to address C. In general, storage cell contents are continually swapped backwards toward the tail, effectively pushing back the existing contents of the storage cells until an empty cell is encountered or the value stored at the tail end is swapped out into backing store 112.

For the spiral cache illustrated in FIG. 3, the spiral network 114 of next neighbor connections is dedicated to the push-back operation. Doing so enables the spiral cache to move one new data item into front-most tile 1 during every systolic cycle, because a fully occupied spiral cache can perform one push-back swap of the contents of each storage cell in each systolic cycle. Details of the systolic cycle in the spiral cache of the present invention are provided hereinafter below in the section entitled Systolic Design. In essence, swap-back and move-forward data arriving at a tile are automatically directed according to the flow patterns described in further detail below. Tiles at edges of the spiral cache array (i.e., the storage cells in the outer turn of the spiral) have any ports that extend toward the outside of the spiral terminated by appropriate circuitry, so that a single tile design can provide all of the functionality of move-to-front and swap backward according to the global clock that provides the systolic pulse operating the spiral cache as described below.

To support the search for and communication of a requested value to front-most tile 1, a second network is provided, a grid-style move-to-front network 116 of next neighbor connections as indicated by the horizontal and vertical arrows in FIG. 3. From a high-level perspective the operation of the move-to-front network is straightforward. For example, when processor 100 requests a value that is stored in tile 49, the processor issues the request at front-most tile 1. The request travels along a diagonal path 118 toward (corner) tile 49. The requested value is found in tile 49, and the value (along with the value's address and flags) moves to front-most tile 1 in an xy-routing pattern via tiles 48, 47, 46, 23, 8, in the specified order. Defining P(a, b, c, d . . . ) as a path of transfer of values from tiles a to b, b to c, c to d, and so forth, it is noted that the travel time along path P(1,9,25,49,48,47, 46, 23,8,1) involves 10 hops, or 10 cycles according to the spatial memory model described above. The analogous access latency in a linear array of 49 tiles would be $t_{49}=2\times 49=98$ cycles. Thus, the 2-dimensional spiral organization reduces the access latency approximately according to the square root of the linear access time for an "un-wrapped" spiral. In general, a k-dimensional spiral having N tiles has a worst-case access latency of $\theta(N^{1/k})$. Worst-case access latency as used herein refers to the latency of accessing a tile with the largest Manhattan distance from tile 1.

Geometric Retry A k-dimensional spiral cache with N tiles reduces the worst-case access latency compared to a linear array from $\theta(N)$ to $\theta(N^{1/k})$. The move-to-front heuristic acts to compact the working set at the front of the spiral, and keeps the most frequently accessed data items near front-most tile 1. The above property cannot be exploited with a search strategy that performs a lookup at each tile, because this would require broadcasting each request to the outer boundary of the cache which incurs the worst-case access latency. Instead, the illustrated spiral cache in accordance with an embodiment of the present invention, implements a search strategy with a best-case access latency of $\theta(1)$ if the request "hits" in (i.e., the requested value is located in) front-most tile 1. Since the values stored in the spiral cache are moved according to the move-to-front placement algorithm described above, processor 100 does not have information specifying a tile where a particular value is stored. Therefore, each access causes a search for the value that corresponds to an address. Rather than look-up the location of the value in a table, such as is typically performed in a conventional associative cache memory, in the spiral cache of the depicted embodiment of the invention, the look-up is performed at each storage cell, by propagating the request to the storage cells, and then returning the requested value from the storage cell at which the requested value is found. According to the assumptions underlying the move-to-front competitiveness result for a linear array given above, a search should scan the tiles from front-most tile 1 towards the tail end of the spiral at backmost tile 49. In a 2-dimensional spiral as illustrated in FIG. 3 the tile array is scanned in a radial fashion. First, a check is performed to determine whether the requested value is stored in front-most storage cell 1. If the value is not located in front-most storage cell 1, the "ring" of radius 2 consisting of tiles 2-9 then the ring of radius 3 with tiles 10-25 are checked and so forth, scanning the tiles on rings with increasing radius. The outward propagating request is handled by the tiles making copies of received requests when the address specified in the requests is not found in the tile. In the description provided below, the spiral cache is divided into quadrants, and the tiles are suitably rotated so that the copies are propagated outward to the next "ring" of the spiral when a "miss" occurs at a storage element. In the present disclosure, the terms "ring" and its "radius" are used loosely, referring to their conformal square maps in the Manhattan layout. However, it is understood that similar concepts apply in layouts that differ from a Manhattan layout and the present invention is not limited to a particular square layout or a layout of another shape, as the move-to-front and push-back functionality of the spiral cache of the present invention may be provided by other layouts in accordance with alternative embodiments of the invention.

Figure 4A:
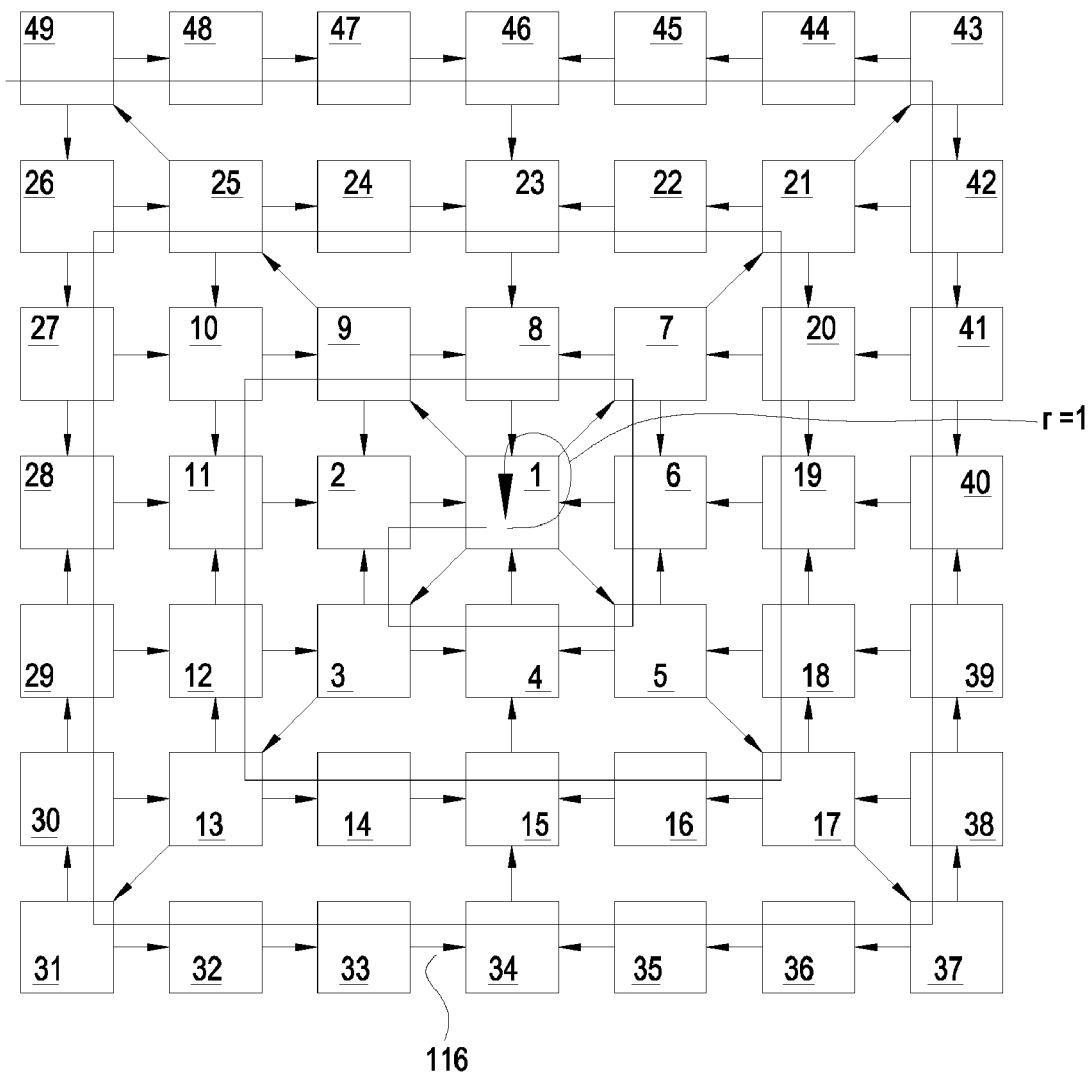
FIGS. 4A-4C are block diagrams illustrating geometric retries within the spiral cache of FIG. 3.
Figure 4B:
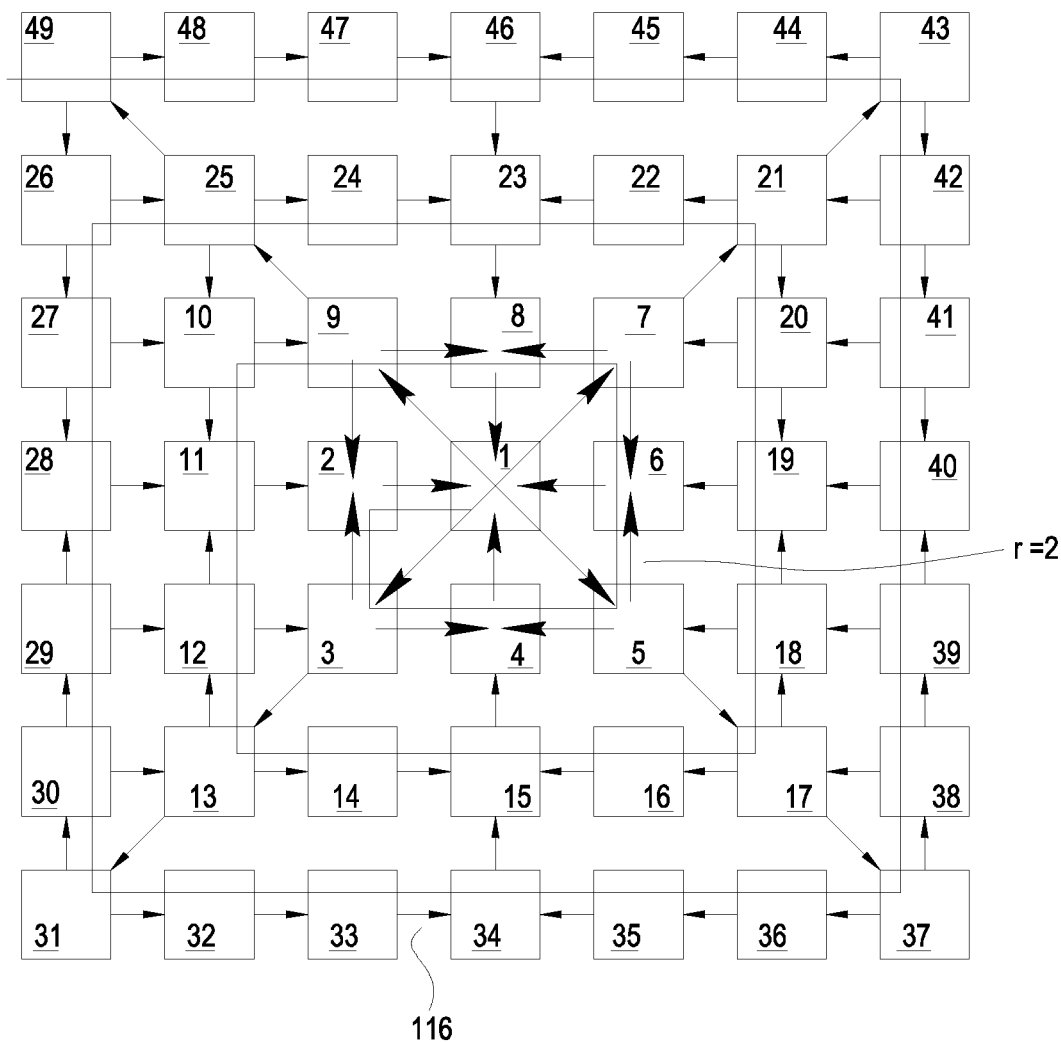
Figure 4C:
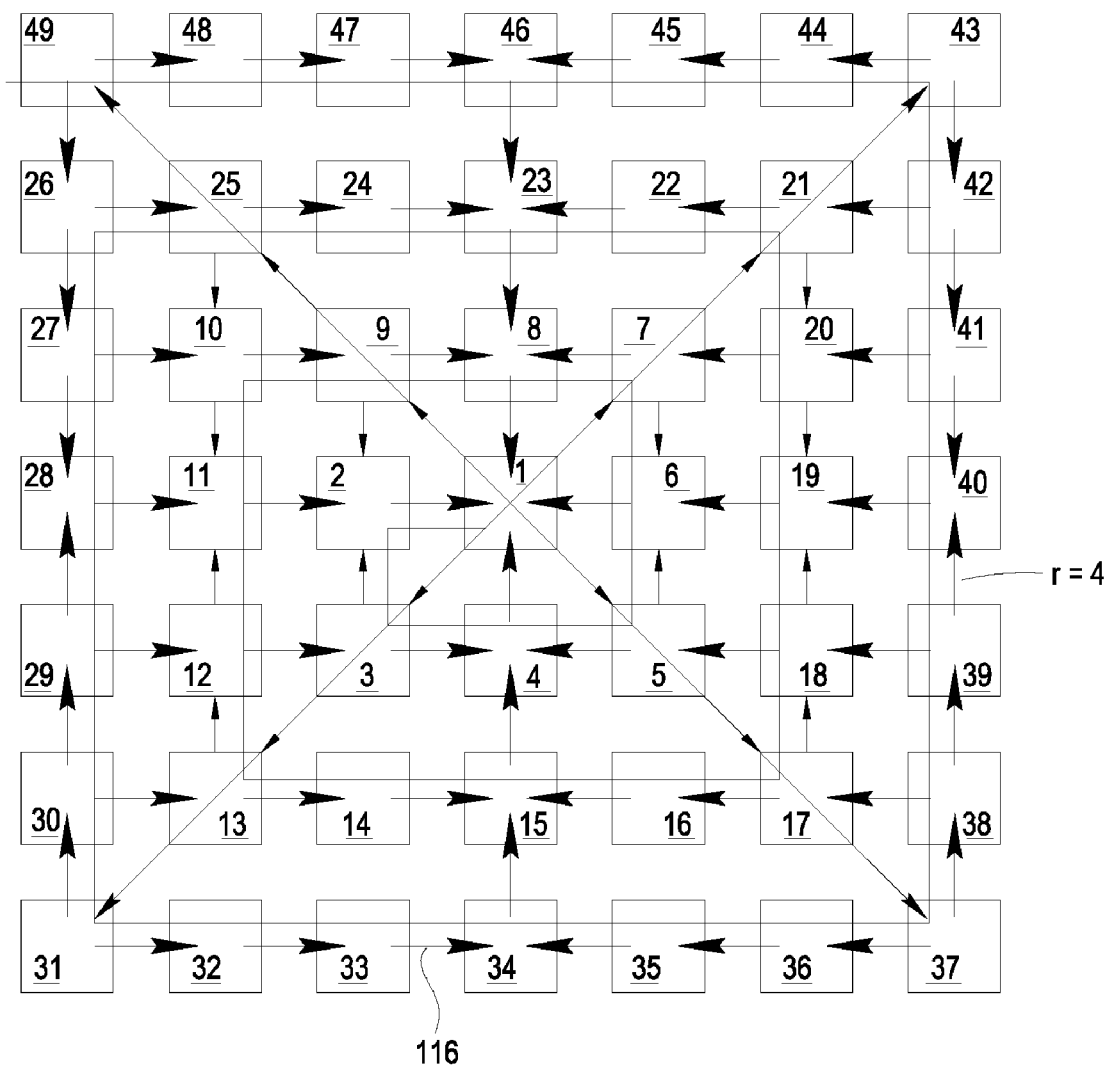

An advantage of the scanning search strategy in the spiral cache of the present embodiment is that it produces a best-case access latency of 1 cycle whenever the requested address is found in tile 1. Due to the move-to-front strategy, this best-case scenario should be achieved frequently. One problem encountered in such a scanning search strategy is the unpredictable flow of values that are moving toward front-most tile 1 when multiple access requests are in flight simultaneously. In order to avoid providing internal buffering and flow control mechanisms, which incur an unnecessary circuit area, circuit power and delay penalty, in accordance with an embodiment of the present invention, a different search strategy may be employed based on the principle of geometric retry. FIGS. 4A-4C illustrate how the move-to-front network 116 supports a search strategy with geometric retry in accordance with an embodiment of the present invention, which operates according to the following principle: "if an item is not found in the area of radius $2^s$, retry the search in the area with radius $2^{s+1}$." FIG. 4A illustrates the procedure for initial radius $2^0=1$ (r=1), which represents the lookup in front-most tile 1. If the lookup in front-most tile 1 fails, all tiles within radius $2^1=2$, (i.e. (tiles 2-9 for r=2) are searched, and also front-most tile 1 is searched again at radius 1, as illustrated in FIG. 4B. If the search fails again, the search radius is again doubled to $2^2=4$, which covers the entire spiral cache (i.e., tiles 1-49 for r=4) as illustrated in FIG. 4C. If the search of the entire spiral cache fails, the requested value is not in the cache and processor 100 must access backing store 112 to fetch the requested value.

The data flow through the spiral cache during a scanning search is illustrated in FIGS. 4A-4C by the large arrows. The particular search case with retry radius $2^0=1$ is trivial, and retry radius $2^1=2$ is a smaller version of the larger scenario exhibited by retry radius $2^2=4$. The communication pattern for only the top right quadrant in FIG. 4C will be described below, as the other quadrants operate analogously and are searched simultaneously. A central principle of the request data flow in a spiral cache in accordance with the illustrated embodiment of the invention, is that requests can and will be copied, and multiple copies of any given request will be in-flight within the spiral cache array, unless the request is satisfied immediately with a look-up in front-most tile 1. A copy of the request is sent to each of the quadrants on each retry and requests can be further copied within the quadrants, as will be described in further detail below. A request propagates from front-most tile 1 outwards along a diagonal path to tile 43 in the top right corner of the spiral cache. At tile 43, the request is simultaneously sent in a direction leftward in the Figure to tile 44 and downward to tile 42, and therefore two copies of the request are generated from one original copy of the request. The leftward communication path continues until tile 46 is reached, and then turns downward toward front-most tile 1. The downward path is followed until tile 40 is reached, where the request is directed to the left toward front-most tile 1. In each of the tiles on the downward paths a left-directed path is split off by sending a copy of the request to the left. From tile 42, the left-directed path traverses tiles 21 and 22, and is then directed downward at tile 23. From tile 41, the left-directed path traverses tiles 20 and 7, and is directed downward at tile 8. In the above-described path traversal, each tile of the quadrant is visited, and a lookup is performed with the address provided with the request.

The geometric retry employed in the illustrated embodiment does not change the asymptotic bounds due to move-to-front or due to the dimensionality of the spiral. It merely introduces constant factors. More explicitly, the following principles hold:

1. Geometric retry at most doubles the worst-case access latency.
2. Geometric retry succeeds to find an item within a factor of 4 of the scan access latency.

These statements are straightforward to prove and carry over to higher-dimensional spiral caches as well.

Figure 5:
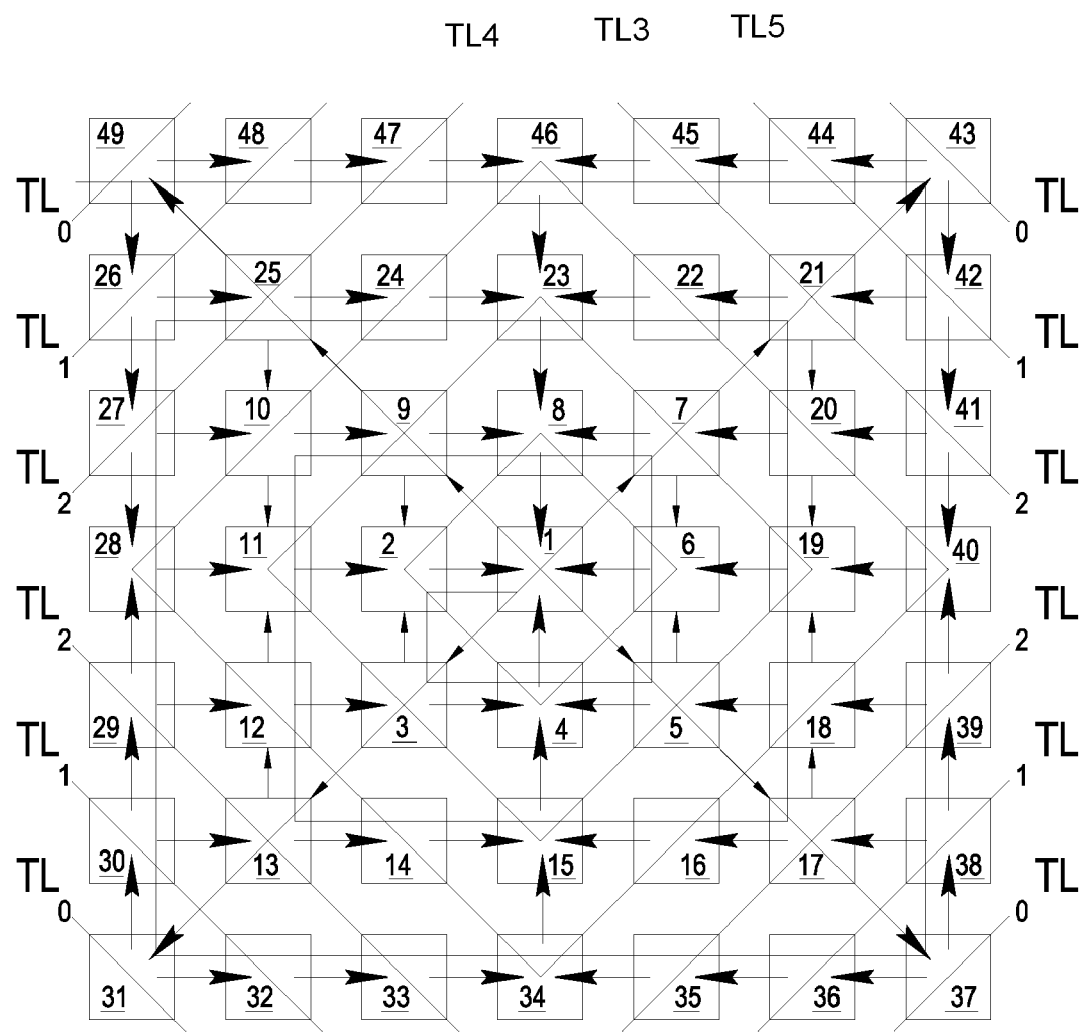
FIG. 5 is a block diagram of the spiral cache of FIG. 3, showing systolic timelines of data flow during operation.

Systolic Design The basic spiral architecture augmented with the geometric retry mechanism can be extended into a systolic architecture in accordance with an embodiment of the invention, providing both low access latency and high throughput at the same time. A timeline is defined as is a subset of tiles that receive a copy of one request for a particular value (i.e. a request containing one address) at the same time. FIG. 5 shows timelines TL0-TL5 that a request traverses from the corners of the cache boundary towards front-most tile 1. Assuming that a request has traveled along the diagonals to corner tiles 49, 43, 37, and 31, at the leftmost and rightmost boundary tiles, the request is duplicated into a horizontally-directed copy and vertically-directed copy as described above. Assuming that a request reaches the corner tiles during cycle 0, it reaches the tiles specified on the timelines TL1 for cycle 1 next. For example, the request in the top left corner tile 49 reaches tiles 26 and 48 during cycle 1. This communication pattern repeats up to timeline TL3, where multiple incoming requests are present at tiles 46, 40, 34, and 28. Note that the requests arriving at each of these tiles must bear the same address, due to the timing of the requests, the point of generation of request copies and the directing of the requests. Similarly, tiles 23, 8, 1, 4, and 15 operate in a conflict-free manner, because each of multiple incoming requests carries the same address during a cycle, and the tiles pass this address along to the neighboring tile connected to their output. In case of tile 1, the output is the processor.

The above-described data flow is conflict-free because a spiral cache with move-to-front placement stores the data associated with each address in at most one tile. Either the address is not present in the spiral cache at all or the address is mapped to (and the corresponding value is stored in) exactly one tile. Thus, at most one of the requests can "find" data in a tile, and move the retrieved data to front-most tile 1. Each of the tiles having multiple inputs either passes the already retrieved data from one of its inputs to an output directed towards front-most tile 1, or receives the same address on each of the inputs, performs a local lookup, and, in case of a hit, retrieves and passes the data or, in case of a miss, passes the address on to the front-directed output. A systolic data flow enables the pipelining of multiple requests. Each request is sent from front-most tile 1 via the diagonal paths to the corner tiles of the array, and the request moves via timelines TL0-TL5 back to front-most tile 1. Viewing each tile on the diagonal paths and each timeline TL0-TL5 as a pipeline stage, the 7×7 spiral cache in FIG. 5 has effectively 10 stages. The illustrated spiral cache generates a throughput of one request per cycle, and maintains 10 requests in flight. In general, an N×N spiral cache with odd N has [N/2]+2[N/2], or approximately 3/2N, pipeline stages.

To obtain a throughput of one request per cycle in the presence of geometric retry, one additional feature is needed. When a tile on the diagonal receives both of: 1) a new request having a retry radius equal to the diagonal tile's radius; and 2) a returning request on the way back to front-most tile 1 during the same cycle, the returning request must have priority. Otherwise, the systolic pattern of requests traveling along the timelines would be destroyed. Rather than abandoning the new request, it is sent outwards on the diagonal paths with an incremented retry radius. This forwarded request can turn toward the front when it encounters a "bubble" in the pipeline of timelines TL4, TL2 and TL0 on the diagonal tiles. If there is no bubble available, the request will travel to the corners on the boundary associated with timeline TL0, where it is guaranteed by structural and functional design to return without conflict toward the front.

Figure 6:
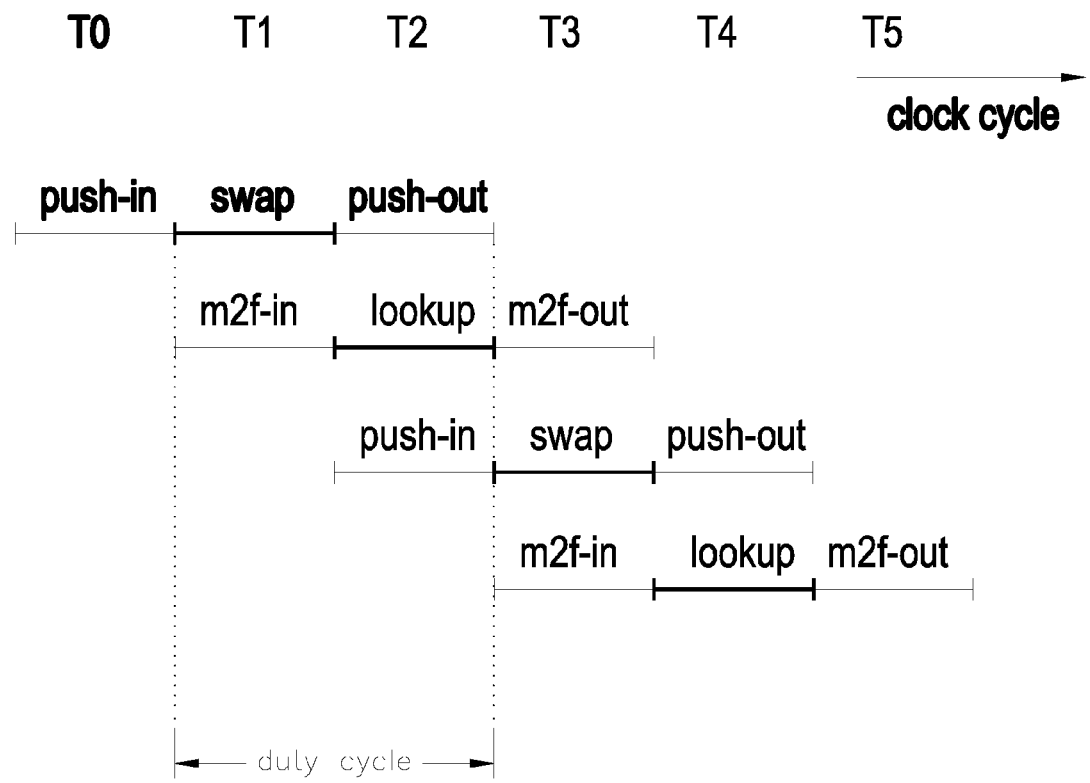
FIG. 6 is a timing diagram illustrating cache micro-operations within the spiral cache of FIG. 3.

In order to perform the above-described operations, the move-to-front and push-back accesses within the tiles must be scheduled. Since the systolic design of the spiral cache in the illustrative embodiment permits one move-to-front lookup operation and one push-back operation per cycle, in a spiral cache in accordance with one embodiment of the present invention, a micro-pipeline with a duty cycle consisting of two clock cycles is included. During the first clock cycle T1, a swap operation swap is performed as part of the push-back functionality, storing input data push-in provided by push-back network 114 and providing the contents of the tile (if non-empty) as output data push-out on push-back network 114. During the second clock cycle T2, a cache lookup lookup is performed to implement the search functionality associated with a request m2f-in moving to the front and moving the request forward on move-to-front network 116 as request m2f-out, populating the data area associated with the request and setting flags if the lookup succeeded. FIG. 6 illustrates the pipelining of cache accesses and next-neighbor communications from the perspective of one tile. A swap operation is incorporated in the illustrative spiral cache tile array design, which: (1) applies the push-back address, (2) reads the cache contents, and (3) writes the push-back data, which can be performed within one clock cycle to meet the two-cycle operation described above, and may include time-borrowing techniques to provide such operation. If a swap operation cannot be practically implemented in a particular design, the swap can be implemented by a one-cycle write operation performed after a one-cycle read operation, and extending the duty cycle of the micro-pipeline to three clock cycles.

Figure 7:
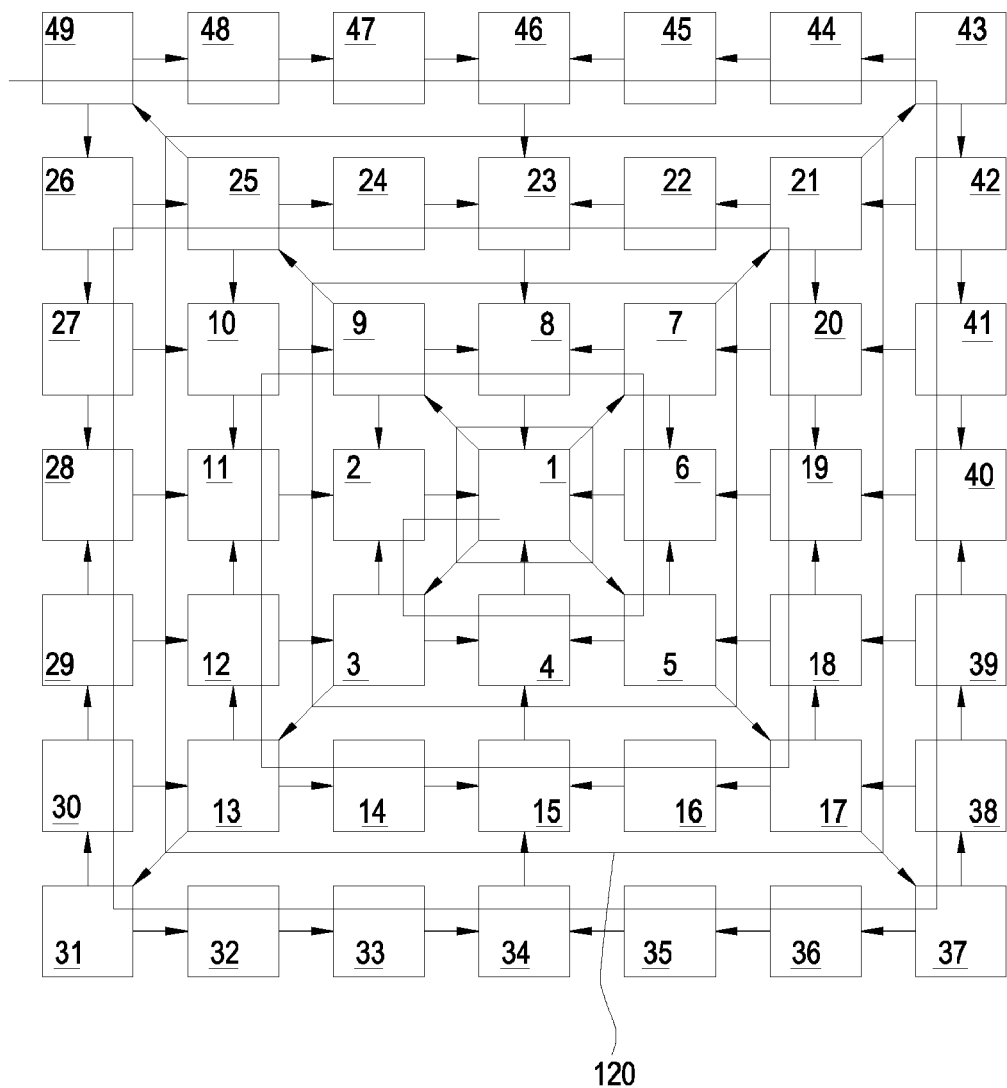
FIG. 7 is a block diagram illustrating a structural nesting property of the spiral cache of FIG. 3.
Figure 8A:
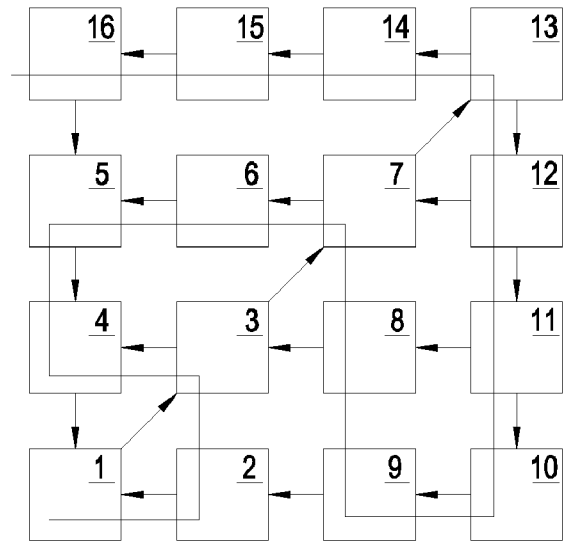
FIGS. 8A-8C are block diagrams illustrating quadrant-based designs of a spiral cache in accordance with other embodiments of the present invention.
Figure 8B:
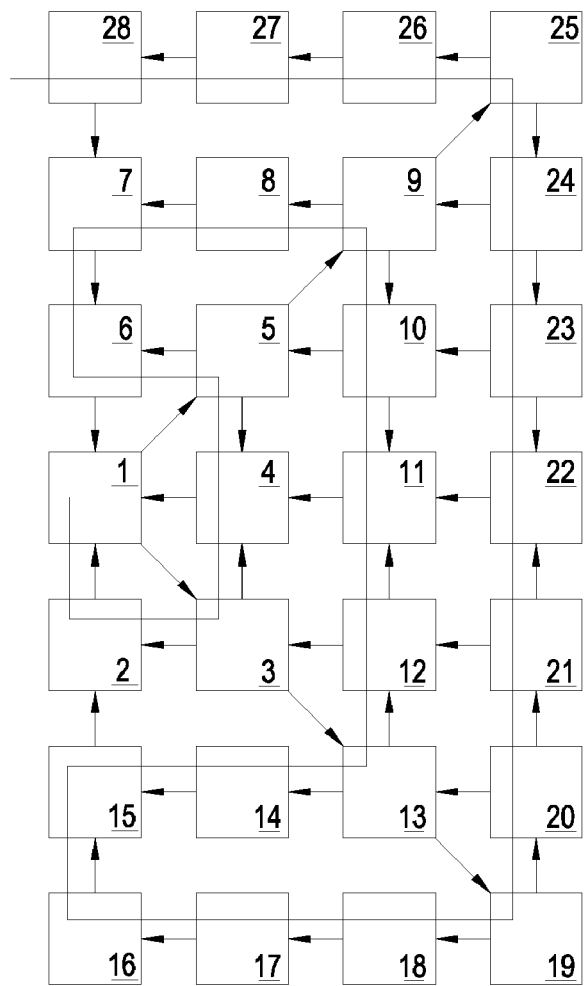
Figure 8C:
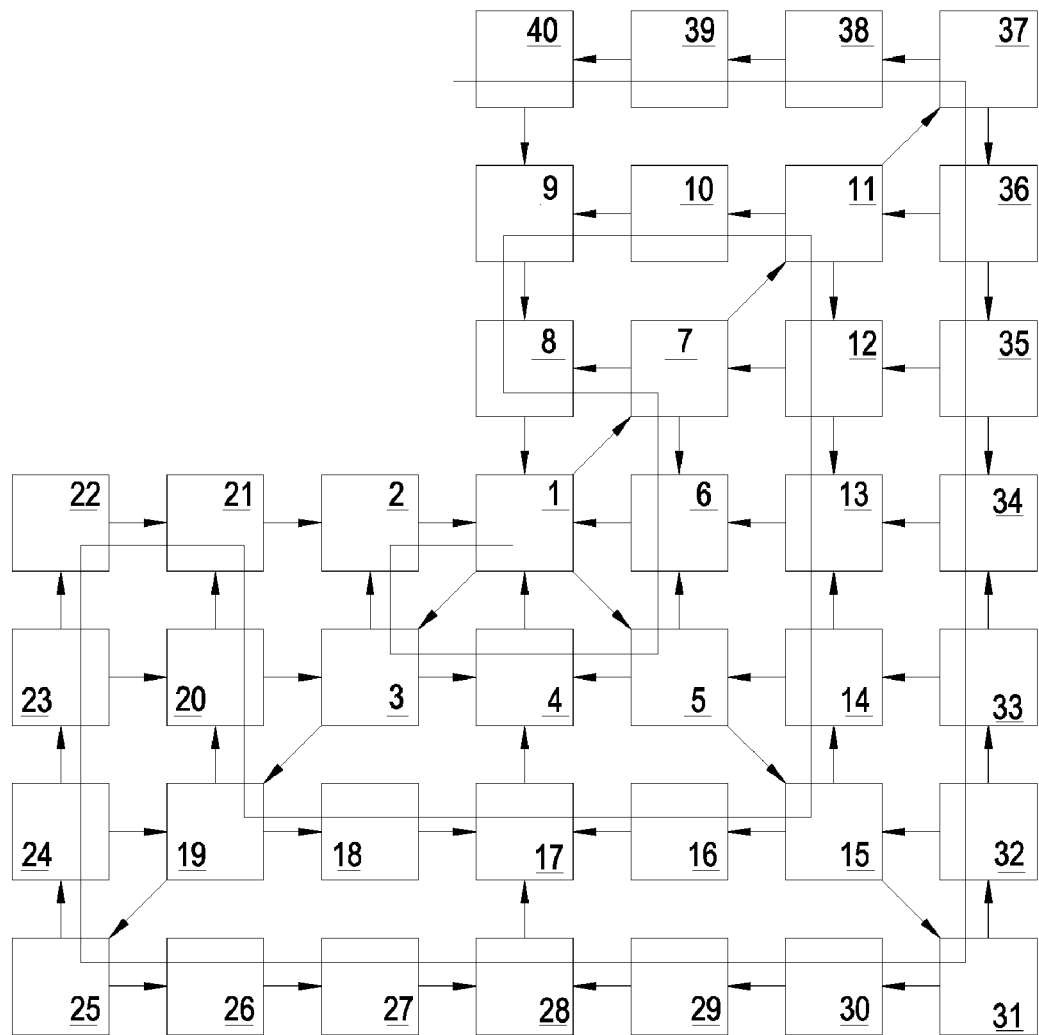

Space-Filling Spiral Caches Spiral caches according to embodiments of the present invention may be implemented using different geometries to yield spiral cache designs in which flexibility of layout can be traded-off for space utilization efficiency. In the applications described above, the effectiveness of the spiral cache architecture is related to its ability to keep the most recently used values in close physical proximity of the processor (or other data sink) for as long as possible. The move-to-front heuristic ensures that access latencies of recently used values remain small. The architecture of the spiral cache as shown in FIG. 7 further supports the above-described value proximity feature by virtue of a structural nesting property: spiral 120 is "tightly wound" around an inner ring, and the spiral path steps to a next outer ring exactly once, crossing the boundary to the next ring only once and by one element space. Consequently, data pushed back on the spiral remain as close to the processor for as long as there is space to store the data. The structural nesting property serves as a design guide for spiral caches with different geometries other than the Archimedes spiral discussed so far, in accordance with alternative embodiments of the present invention. For example, the 1-quadrant design depicted in FIG. 8A may serve as building block to assemble a rectangular 2-quadrant design as shown in FIG. 8B or an L-shaped 3-quadrant design as depicted in FIG. 8C. A visual observation of each of the layouts of FIGS. 8A-8C reveals that the spiral network in these designs observes the structural nesting property, although the alternative layouts do not resemble the geometry of an Archimedes spiral.

Figure 9:
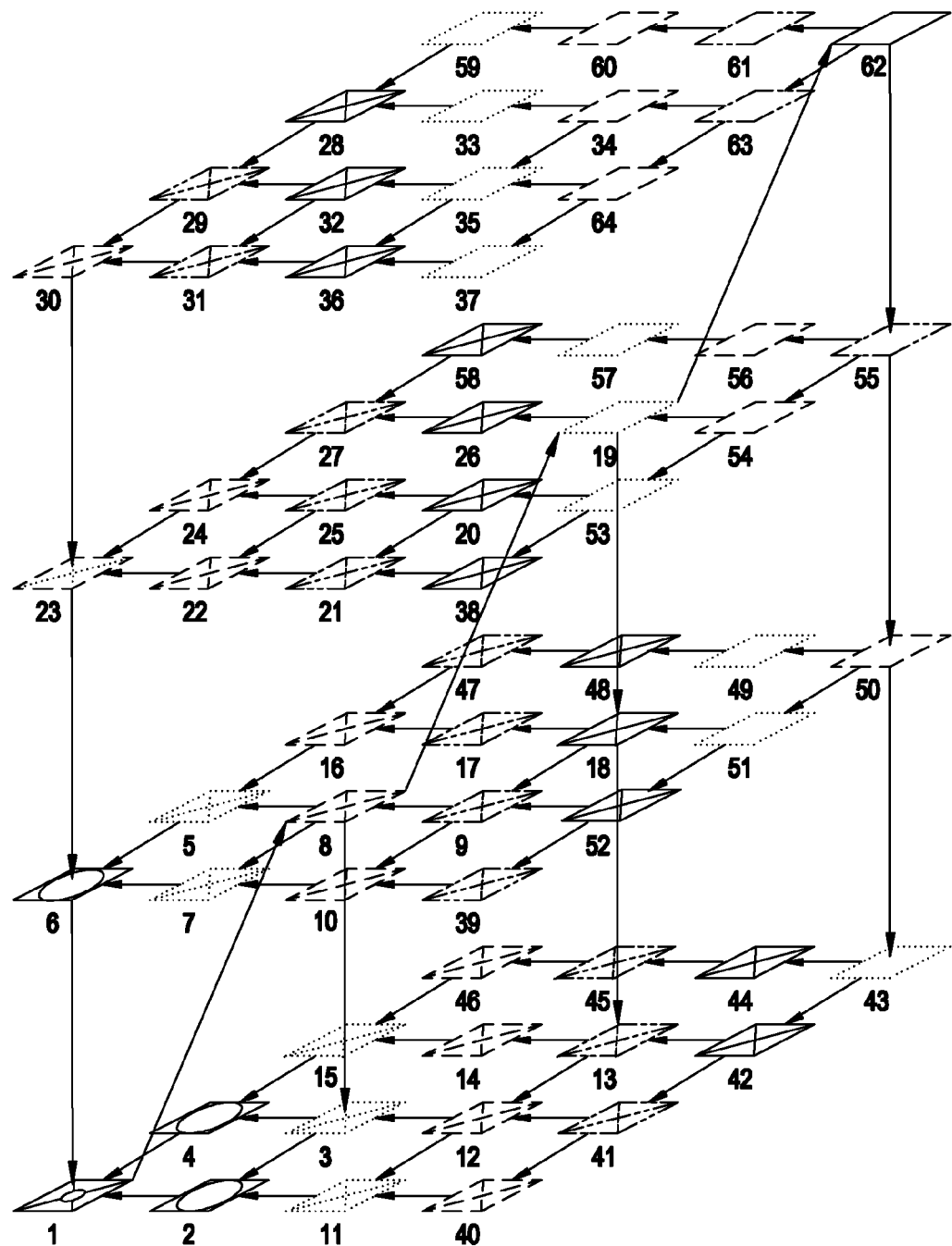
FIG. 9 is a block diagram illustrating a three-dimensional spiral cache in accordance with yet another embodiment of the present invention.

As in the multi-quandrant embodiments depicted above, the spiral cache may also be extended to 3-dimensional architectures in accordance with alternative embodiments of the present invention. FIG. 9 depicts a 1-octant design of a 4×4×4 spiral cache. Multiple octants can be connected in a manner analogous to the 2-dimensional quadrants described above to fill a 3-dimensional space. In FIG. 9, the spiral network is not shown for clarity, but connects tiles according to their number sequence. Time-planes are indicated by the pattern shape of the tile edges and shapes within the tile, i.e., empty tiles with solid edges are on one time-plane, empty tiles with dotted edges are another time-plane, tiles with symbols and various edge shapes are on other time-planes, and so forth.

Figure 10A:
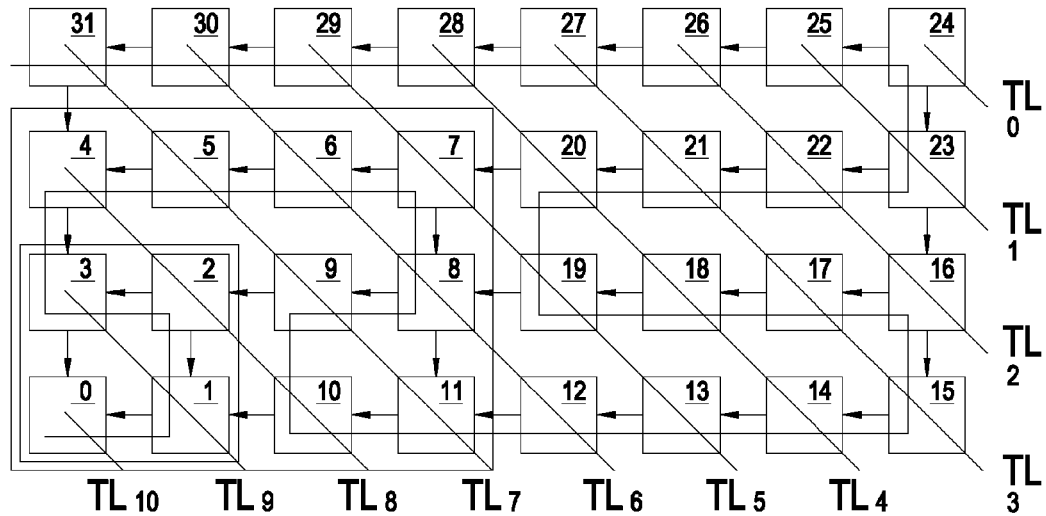
FIGS. 10A-10C are block diagrams illustrating "stretched" spiral cache designs in accordance with still other alternative embodiments of the present invention.
Figure 10B:
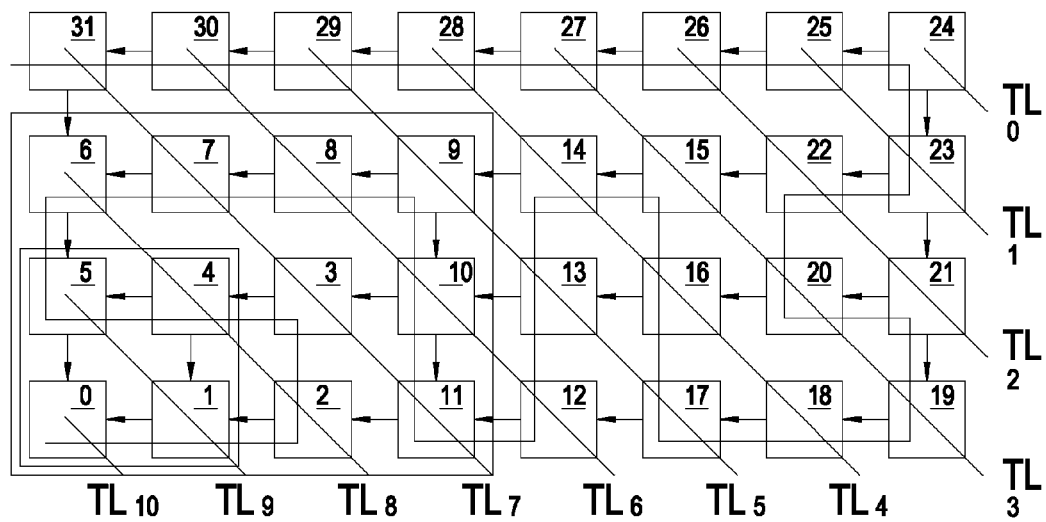
Figure 10C:
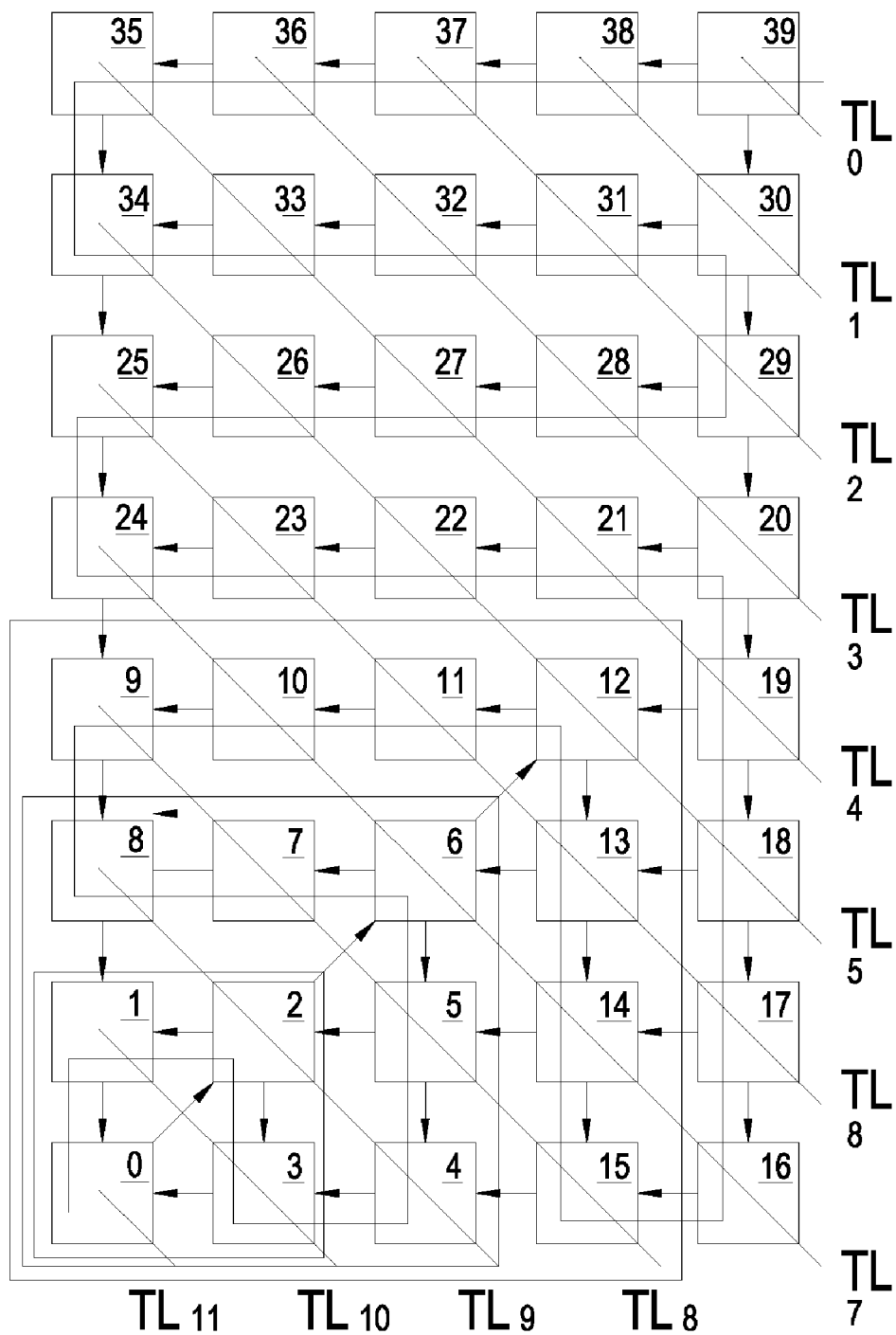

FIGS. 10A-10C illustrate yet another variation on the spiral cache design in accordance with yet another embodiment of the invention. In FIGS. 10A-10C, rectangular geometries with arbitrary aspect ratios are provided by sizing the tiles such that the propagation delay across multiple tiles fits within one clock cycle. Geometric constraints on the spiral cache design can be relaxed even further, if it is permissible to trade micro-pipelining efficiency of a duty cycle for flexibility in aspect ratio. The designs in FIGS. 10A-10C can be used to demonstrate this concept. The spiral cache designs depicted in FIGS. 10A and 10B show two possible organizations of an a 8×4 spiral cache with timelines TL0-TL10, and the design depicted in FIG. 10C illustrates a 5×8 spiral cache with timelines TL0-TL11. Each of the spiral caches of FIGS. 10A-10C are guided by the structural nesting property. In contrast to the other designs described above in accordance with other embodiments of the present invention, the diagonal pathway is "stretched" across multiple tiles rather than connecting next neighbors only. Considerable flexibility with respect to possible aspect ratios is available using present-day VLSI technology, in which higher-level metal layers can be employed to implement faster and longer wires. However, such flexibility is understood to disappear due to physical limits when signal propagation speed approaches the speed of light.

Design Considerations and features of the Spiral Cache In conclusion, there are several features of the spiral cache of the present invention as described above that provide flexibility to the designer and other advantages as noted below:

1. The spiral cache is a tiled architecture. Unlike traditional hierarchical memory designs, it is relatively easy to replicate the tiles to implement a spiral cache of desired size or capacity.
2. The size of the memory array within a tile can be varied at the designer's discretion to balance access latency, throughput, and power consumption. The smaller the array, the lower its access time, and the faster the entire spiral cache becomes. Furthermore, when a spiral cache of given capacity is based on smaller arrays, the number of tiles increases, which increases the pipeline depth and leads to higher throughput. However, a larger number of smaller tiles increases the worst-case access latency. As the worst-case access latency approaches the latency of the backing store, the performance gain of the spiral cache diminishes as it will with any other cache architecture. If wire efficiency is of primary concern, the array size should generally be chosen purely based on technological constraints such that the propagation delay across a tile equals the access latency of the array within a tile.
3. The move-to-front heuristic serves as a 2-competitive (re-)placement strategy of cache lines into tiles. No other cache architecture offers such a theoretical performance guarantee.
4. The move-to-front heuristic compacts the working set at the head of the spiral network. This self-organizing property implies small average access latency and low power consumption. As an aside, it is noted that so-called "cache oblivious algorithms" are honored by the spiral cache architecture. The benefit is not necessarily a performance gain compared to traditional hierarchies, because cache oblivious algorithms perform well on traditional caches, as well. It has been observed through simulation that applications performing particularly poorly on systems employing traditional memory hierarchies exhibit more substantial performance gains on the spiral cache. However, cache oblivious algorithms exhibit remarkably effective move-to-front compaction, which minimizes average access latency.
5. The systolic architecture of the spiral cache avoids the worst-case access latencies for each access incurred in earlier systolic designs by employing the move-to-front placement strategy and the search scheme with geometric retry. Furthermore, the spiral cache avoids the implementation overhead of buffering and flow control mechanisms required by ordinary pipelined hierarchical memory architectures. Instead, the move-to-front heuristic enables average access latencies to approach the best-case access latency which occurs when accessing the front-most tile only.
6. The tiled architecture is inherently pipelined. This pipelining capability facilitates a high-throughput memory with multiple accesses supported in-flight. Various processor architectures are capable of exploiting this property including superscalar processors, multithreaded processors, or parallel (multicore) architectures. Sharing a spiral cache among multiple threads or processors by interleaving their accesses has the potential to provide a inherently consistent memory architecture.
7. The need for interleaving push-back swap operations with move-to-front lookups in the array of each tile leads to a micro-pipelined design with a duty cycle of two or three clock cycles, depending on whether the array supports a single-cycle swap operation. If the latency due to the micro-pipeline is of concern, the latency can be avoided by doubling or tripling the clock frequency of the cache relative to the processor, or the latency can be masked by means of an additional L1-cache positioned between the processor and the spiral cache.
8. The spiral cache is capable of exploiting the dimensionality of Euclidean space. More succinctly, a k-dimensional spiral cache with tiles has a worst-case access latency of $\Theta(^k\sqrt{N})$.
9. A N-tile spiral cache behaves like an N-way set-associative cache. This statement assumes that each tile consists of a direct-mapped cache. The move-to-front heuristic together with the push-back functionality of the spiral network effectively implement an LRU stack for each (address) index. Using direct-mapped caches does not incur the cost of explicit LRU bookkeeping found in traditional set-associative caches. If the memory arrays within each tile were organized as n-way set-associative caches, however, then the spiral cache would provide the equivalent associativity of an (nN)-way set-associative cache.

Figure 11B:
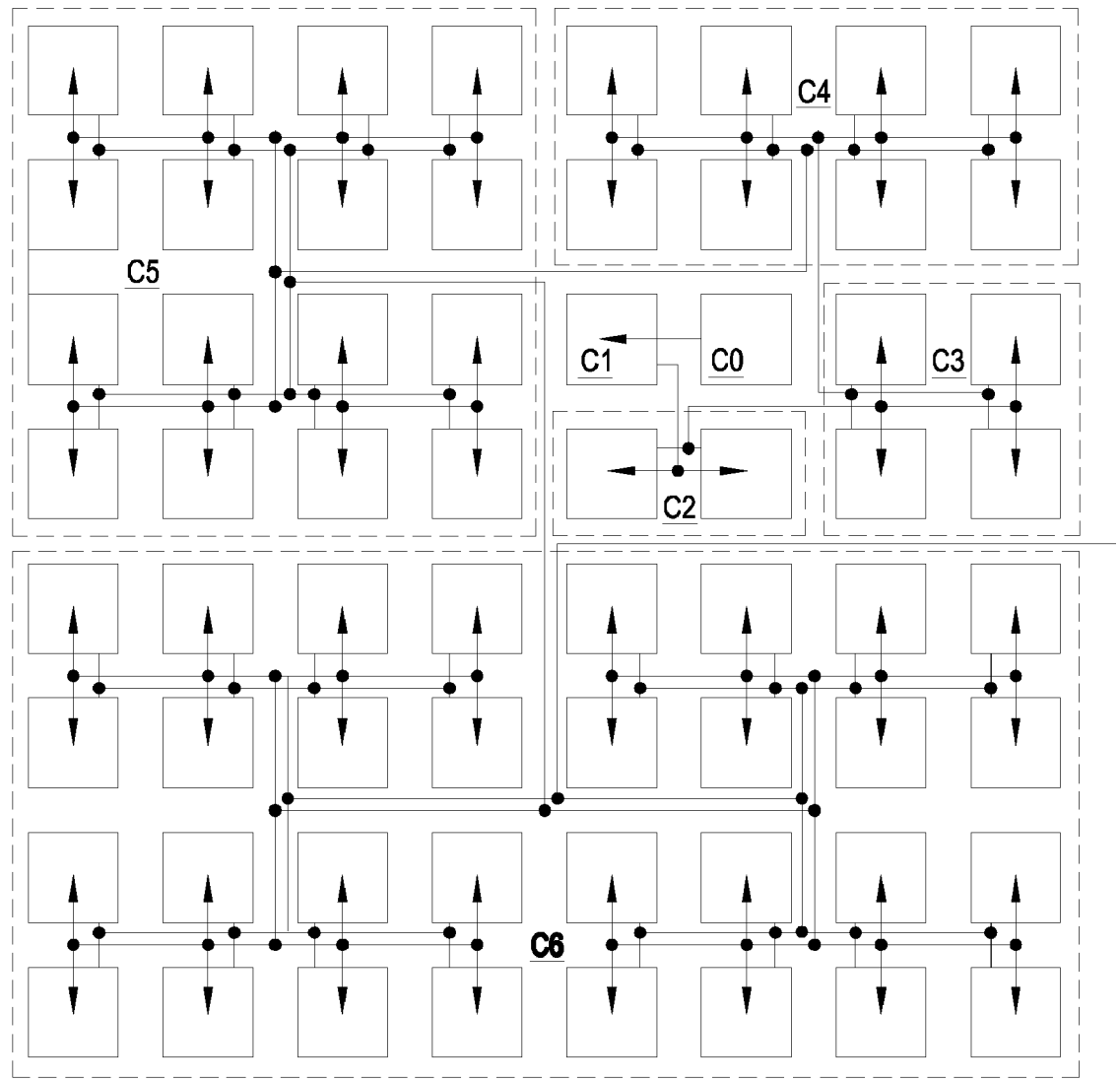
Figure 5:
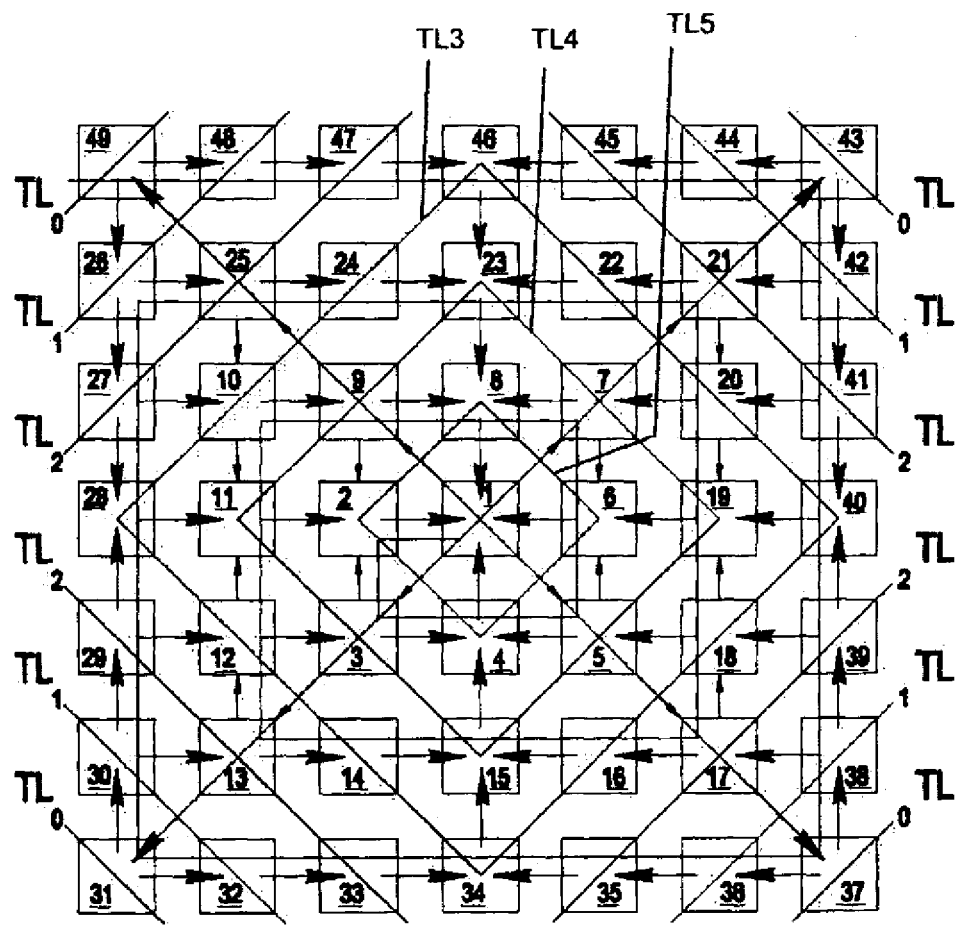

The exemplary two-dimensional caches described above assume a two-dimensional spiral organization based on the geometry of an Archimedes spiral, i.e., the distance between the "turns" of the spiral is uniform, which is preserved when mapping the Archimedes spiral into a Manhattan layout. The Archimedes spiral is well-suited for a regular spiral cache design composed of identical tiles. However, the present invention is not limited to such spiral arrangements and other spiral geometries have useful properties for organizing spiral caches in accordance with other embodiments of the present invention. Referring now to FIG. 11A, a spiral cache organized as a logarithmic spiral is illustrated. Spiral path 122 forming the push-back network no longer passes through uniform tiles, but groups of tiles that increase in size as the spiral moves outward, according to doubling the area (storage size) of alternating squares and rectangles while moving outward along spiral path 122. In another alternative (not shown) the area of the tiles can be increased according to the golden ratio. In order to preserve the functionality of the push-back network within the spiral cache, and in order to effectively use the wires according to the access times of the tiles, each tile may be implemented as a set-associative cache, with the associativity doubling with each tile along spiral path 122, as illustrated in FIG. 11B which maps directly onto FIG. 11A, in which the number of elements in each tile C1-C6 is doubled along spiral path 122 as spiral path moves outward, while central tile C0 and first tile C1 are of nominal size according to the Archimedian spirals described above. Therefore, tile C2 contains two tile elements organized as a set-associative cache, tile C3 has four such elements, tile C4 has 8 and so forth.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A spiral memory circuit, comprising:
multiple storage elements for storing values; and
access circuitry coupled to the multiple storage elements forming at least one information pathway for moving values among the multiple storage elements, wherein requested values provided in response to requests are moved to a central front-most one of the multiple storage elements to provide access to the requested values at the central front-most storage element, and wherein the values stored in remaining ones of the multiple storage elements are swapped backward at each access, in a direction of a spiral arrangement to locations other than the central location, wherein a least-recently-accessed value is either stored in a front-most empty one of the storage elements or is pushed out of the spiral memory circuit to a backing store interface.

2. The spiral memory circuit of claim 1, wherein the requests are propagated from the central front-most storage element toward the outside edges of the spiral, wherein the request contains an indication of whether or not the request has been fulfilled by reaching a particular one of the multiple storage elements containing the value.

3. The spiral memory circuit of claim 2, wherein fulfilled ones of the requests are propagated among the multiple storage elements in a collision-free pattern that ensures that multiple requests arriving at one of the storage elements at the same time will be copies of the same request.

4. The spiral memory circuit of claim 2, wherein the at least one information pathway is a single set of next-neighbor connections between the multiple storage elements, and wherein the movement of the values and the propagating of the requests are multiplexed in multiple phases of a systolic clock that controls which of the next-neighbor connections transfer the requests and the values.

5. The spiral memory circuit of claim 4, wherein the movement of the values and the propagating of the requests proceeds through one of the multiple storage elements at each systolic clock cycle.

6. The spiral memory circuit of claim 1, wherein the at least one information pathway multiple next-neighbor connections interconnecting the multiple storage elements, wherein a first set of the next-neighbor connections is used to move requested values forward to the central front-most storage location and wherein a second set of the next-neighbor connections is used to swap the other values backward.

7. The spiral memory circuit of claim 1, wherein the multiple storage elements are cache memories.

8. The spiral memory circuit of claim 7, wherein the cache memories are of non-uniform size.

9. The spiral memory circuit of claim 7, wherein the cache memories are of uniform size.

10. A method of caching a plurality of values within a storage device, comprising:
storing the plurality of values in multiple storage elements;
in response to a request for one of the plurality of values, moving the requested value to a central front-most one of the storage elements;
swapping remaining ones of the plurality of values backwards in a direction of a spiral arrangement to a corresponding next-backward neighbor, wherein a least-recently-accessed one of the plurality of values is either stored in a front-most non-empty memory location or is pushed out a last one of the multiple storage elements in the direction of the spiral to a backing store interface.

11. The method of claim 10, further comprising propagating the request from the central front-most storage element toward the outside edges of the spiral, wherein the request contains an indication of whether or not the request has been fulfilled by reaching a particular one of the multiple storage elements containing the value.

12. The method of claim 11, wherein fulfilled ones of multiple requests are propagated among the multiple storage elements in a collision-free pattern that ensures that multiple requests arriving at one of the storage elements at the same time will be copies of the same request.

13. The method of claim 11, wherein the moving and swapping of the values and the propagating of the requests are multiplexed in multiple phases of systolic pulse across a single communication pathway.

14. The method of claim 11, wherein the moving and swapping of the values and the propagating of the requests proceeds through one of the multiple storage elements at each systolic pulse.

15. The method of claim 10, wherein the moving of the requested value forward and the swapping of other values backward are performed on separate sets of next-neighbor interconnects between the multiple storage elements.

16. The method of claim 10, wherein the multiple storage elements are cache memories and wherein the requested value is a cache line.

17. The method of claim 16, wherein the cache memories are of non-uniform size.

18. The method of claim 16, wherein the cache memories are of uniform size.

19. A processing system, comprising:
a processor for executing program instructions and operating on data values; and
a spiral cache memory for caching values including at least one of the program instructions or the data values, wherein in response to a request for a particular one of the values, the average access latency depends in substantial proportion to a square root of a number of accesses for unique other values since the particular value was previously requested.

20. The processing system of claim 19, wherein a maximum access latency in response to the request is less than or equal to a minimum access latency multiplied by a root of a number of storage elements within the spiral cache memory, wherein the order of the root is a dimensionality of the spiral cache memory.

21. The processing system of claim 19, wherein the values stored within the spiral cache memory self-organize according to frequency of access, wherein a central front-most storage location that provides direct access to the values by the processor contains the most-recently-accessed one of the values at the end of each access to the spiral cache memory.

22. The processing system of claim 21, wherein the spiral cache memory comprises a spiral of smaller cache memories, and wherein the central front-most storage location provides uniform access to at least one cache line entry of the spiral cache.

23. The processing system of claim 22, wherein the smaller cache memories are of non-uniform size.

24. The processing system of claim 22, wherein the smaller cache memories are of uniform size.

* * * * *

UNITED STATES PATENT AND TRADEMARK OFFICE
CERTIFICATE OF CORRECTION

| | |
|---|---|
| PATENT NO. | : 8,060,699 B2 |
| APPLICATION NO. | : 12/270095 |
| DATED | : November 15, 2011 |
| INVENTOR(S) | : Strumpen |

It is certified that error appears in the above-identified patent and that said Letters Patent is hereby corrected as shown below:

In the drawings, Sheet 7, Fig. 5, lines should connect reference designators TL4, TL3 and TL5 with the indicated features as shown on attached sheet.

Signed and Sealed this
Fifteenth Day of December, 2015

Michelle K. Lee
*Director of the United States Patent and Trademark Office*